Patented Sept. 8, 1936

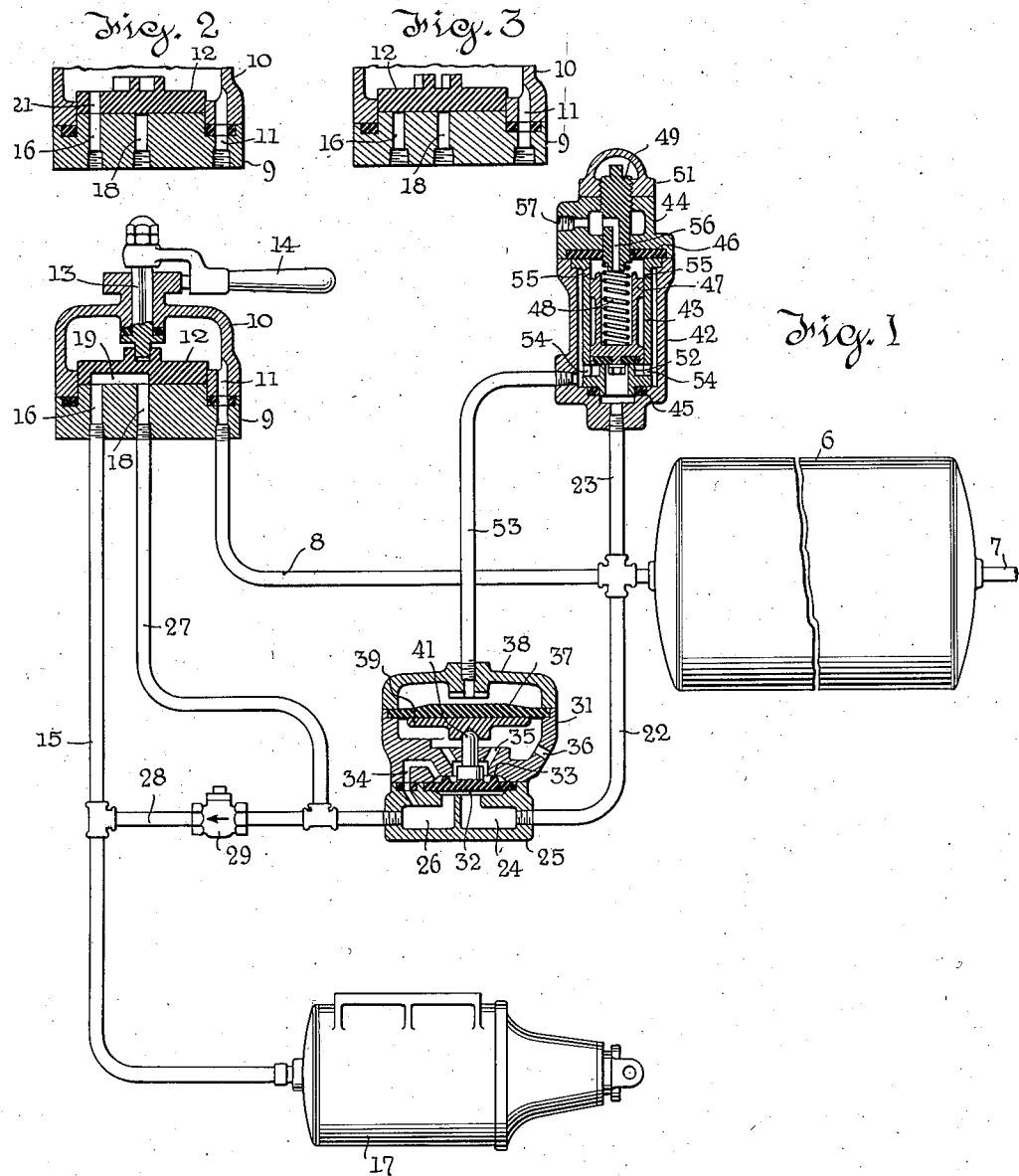

2,053,461

UNITED STATES PATENT OFFICE 2,053,461

FLUID PRESSURE BRAKE

Charles A. Campbell, Watertown, N. Y., assignor to The New York Air Brake Company, a corporation of New Jersey Application June 18, 1935, Serial No. 27,269

5 Claims. (Cl. 303—63)

This invention relates to air brakes. The purpose of the invention is to provide a simple mechanism applicable to straight air systems which functions to hold the brake applied irrespective of the position of the engineer's brake valve whenever the system is partially charged or its charge falls below a safe minimum value. The effect is to apply the brakes as the system is being charged until a safe condition for operation of the train is reached, and to apply the brakes automatically if the state of charge of the system at any time falls below this safe value.

Generally stated, the invention contemplates a valve controlling the exhaust port of the engineer's brake valve and functioning in response to main reservoir pressure to connect the exhaust port to atmosphere when main reservoir pressure is above a safe value and to connect the exhaust port to the main reservoir and disconnect it from atmosphere when the charge in the reservoir is below a safe value. The valve which connects the engineer's brake valve exhaust selectively to atmosphere and to the main reservoir is conveniently operated by a pressure motor to which fluid pressure is admitted or exhausted by a valve of the type known in the air brake art as a protection valve. To meet conditions which would exist in lap position of the engineer's brake valve the exhaust port of the brake valve is connected to the straight air pipe through a check valve so that air can flow from the exhaust pipe to the straight air pipe but not from the straight air pipe to the exhaust pipe. In this way the engineer's brake valve is bypassed in lap position to produce an application whenever the state of charge is below a safe value.

The invention is applicable generally to straight air systems and it will be understood that these systems commonly include relay valves, emergency application valves and deceleration controllers. The presence or absence of devices of this sort does not affect the principle of the invention herein claimed, and accordingly it will be described as embodied with the simplest type of engineer's brake valve and with a single straight air brake cylinder, such cylinder typifying a straight air brake applying means or system.

In the drawing,—

Fig. 1 is a diagram, chiefly sectional, of a simple straight air system equipped with my invention. The engineer's brake valve is shown in release position.

Fig. 2 is a fragmentary section of the engineer's brake valve showing application position.

Fig. 3 is a sectional view showing lap position.

In the drawing, 6 represents the main reservoir which is supplied with air under pressure from any suitable source, through the connection 7. The main reservoir pipe 8 leads to the pipe bracket and rotary valve seat element 9 of the engineer's brake valve. Mounted on the bracket 9 is a cap 10 and the pipe 8 delivers main reservoir air to the space within the cap through the connecting passage 11. The rotary valve is shown at 12 and is turned through the usual key 13 by means of the brake valve handle 14.

The straight air pipe 15 connects with the brake cylinder port 16 in the seat of the rotary valve and leads to the straight air brake applying means, which in the drawing is typified by the single brake cylinder 17. The exhaust port in the seat of the rotary valve is indicated at 18 and in the ordinary construction would lead directly to atmosphere.

The rotary valve 12 has a cavity 19 which in release position (Fig. 1) connects the ports 16 and 18 and thus exhausts the brake cylinder. The valve 12 also has a through port 21 which in service position (Fig. 2) admits main reservoir air from the space within the cap to the straight air port 16. At such times the exhaust port 18 is blanked. In lap position (Fig. 3) both the ports 16 and 18 are blanked.

The structure so far described is a conventional representation of a simple straight air system and its operation will be readily understood.

Connected to pipe 8 are two branches 22 and 23. Branch 22 leads to a chamber 24 in a valve body 25. From an adjacent chamber 26 in the body 25 is connected a pipe 27 which is connected with the exhaust port 18 of the brake valve. Between the pipe 27 and the straight air pipe 15 is a bypass connection 28 in which is interposed a check valve 29 so arranged as to permit flow toward the straight air pipe 15 and prevent flow in reverse direction. Clamped between the member 25 and an intermediate casing member 31 is a combined diaphragm and valve member 32 having an annular rib 33 on its upper face. This diaphragm, in the upper position, indicated in Fig. 1, permits free communication between the chambers 24 and 26 and consequently at such time connects the main reservoir 6 by way of pipe 22, chambers 24 and 26, pipe 27, port 18, cavity 19 and port 16 with the straight air pipe 15, applying the brakes with main reservoir pressure. Under these conditions there may also be flow from chamber 26 by way of check valve 29 and pipe 28 to the straight air pipe 15.

If the rotary valve 12 should be in lap position (Fig. 3) the check valve 29 assures flow to the straight air pipe. At such time diaphragm 32 is held upward by main reservoir pressure, causing the rib 33 to seal and close an exhaust passage leading from the chamber 26 to atmosphere by way of the passage 34, passages 35 and vent 36.

When the diaphragm 32 is forced downward it disconnects the chambers 24 and 26 and vents chamber 26 by way of 34, 35 and 36. Diaphragm valve 32 thus acts to connect the exhaust pipe 27 of the engineer's brake valve selectively with the main reservoir or with atmosphere. To shift the diaphragm 32 to perform these functions use is made of a motor diaphragm 37 clamped between the member 31 and a cap 38. The diaphragm 37 may be subjected to pressure on its upper side by means hereinafter described, and when under pressure reacts through a thrust plate 39 on a stem 41 which engages the diaphragm 32.

The diaphragm 37 is of substantially greater area than is the diaphragm 32, so that when it is subjected to main reservoir pressure it holds the diaphragm 32 downward despite the upward reaction of main reservoir pressure on the diaphragm 32.

The branch 23 leads to the end port in the casing 42 of a so-called protection valve. Mounted in the body of the protection valve and spaced therefrom is a cylindrical bushing 43 which is retained by the cap 44 and sealed by gaskets 45 and 46. Slidable in the bushing 43 is a cup-shaped piston 47 which is urged downward by a coil compression spring 48. The spring reacts against the lower end of a thrust stem 49 threaded in the upper end of the cap 44 and sealed by a locking cap 51. The lower end of the piston 47 is provided with a rubber seating face which coacts with a seat rib 52 formed in bushing 43 and controlling communication with the pipe 23. The space within the cap 38 is connected by pipe 53 with the annular space between the body 42 and the bushing 43. This space communicates with the space at the lower end of the piston 47 through ports 54 and with the space above the piston 47 (when the latter is in its lower position) through ports 55. There is an exhaust passage 56 in the stem 49 and this leads to atmosphere through the passage 57.

When the pressure in the reservoir 6 acting on the end of the piston 47 within the seat rib 52, is insufficient to overpower the spring 48, the piston 47 is in its lowermost position. At such time the space above the diaphragm 37 is vented to atmosphere by way of the annular space around the bushing 43, ports 55, passage 56 and passage 57. It follows that the diaphragm 32 is in its upper position and the brakes are applied irrespective of the position of the rotary valve 12. The strength of the spring 48 is so chosen that when pressure in the main reservoir reaches a safe value, the piston 47 will start to move upward against the resistance offered by spring 48. Initial motion exposes the entire area of the lower end of piston 47 and this piston moves to its uppermost limit, seating against the gasket 46. In so doing it closes the exhaust from pipe 53 and connects pipes 23 and 53 together so that main reservoir air acting on the upper face of the large diaphragm 37 forces diaphragm 32 to its lower position. In so doing it isolates chamber 24 from chamber 26 and connects exhaust pipe 27 to atmosphere, as already described. Consequently, if the system is being charged the brakes will be held applied until the pressure in the reservoir 6 reaches a safe value. At that time piston 47 will shift, causing diaphragm 37 to shift diaphragm 32. This cuts off the supply of main reservoir air to the exhaust pipe 27 and connects the exhaust pipe 27 to atmosphere. It follows that the brakes will immediately release if the brake valve handle 14 is in release position. If the brake valve handle 14 is in either application or lap position the brakes may be released by moving the valve handle to release position.

As explained, the invention is illustrated as applied to the simplest possible straight air system. It may be applied in the same or slightly modified forms to other more complicated straight air systems without departing from the spirit of the invention, and this fact is expressly recognized.

What is claimed is,—

1. In a fluid pressure brake system, the combination of a straight air pipe; a main reservoir for supplying pressure fluid to the system; an engineer's brake valve having an exhaust passage normally leading to atmosphere, the brake valve being adapted to admit and exhaust pressure fluid to and from the straight air pipe; means responsive to main reservoir pressure and effective when such pressure is below a chosen value to disconnect said exhaust passage from atmosphere and connect it with main reservoir; and a one-way flow connection from said exhaust passage to said straight air pipe.

2. In a fluid pressure brake system, the combination of a straight air pipe; a main reservoir for supplying pressure fluid to the system; an engineer's brake valve having an exhaust passage normally leading to atmosphere, the brake valve being adapted to admit and exhaust pressure fluid to and from the straight air pipe; two-way valve means shiftable to connect said exhaust passage alternatively with atmosphere and with the main reservoir; a motor for shifting the last-named valve means; and a controller for said motor responsive to the rise and fall of main reservoir pressure above and below a chosen value.

3. In a fluid pressure brake system, the combination of a straight air pipe; a main reservoir for supplying pressure fluid to the system; an engineer's brake valve having an exhaust passage normally leading to atmosphere, the brake valve being adapted to admit and exhaust pressure fluid to and from the straight air pipe; two-way valve means shiftable to connect said exhaust passage alternatively with atmosphere and with the main reservoir; a motor for shifting the last-named valve means; a controller for said motor responsive to the rise and fall of main reservoir pressure above and below a chosen value; and a one-way flow connection from said exhaust passage to said straight air pipe.

4. The combination defined in claim 2 in which the two-way valve means comprises a flexible diaphragm and the motor comprises a larger flexible diaphragm.

5. The combination defined in claim 2 in which the two-way valve means comprises a flexible diaphragm, the motor comprises a larger flexible diaphragm, and the controller is a protection valve subject to main reservoir pressure and serving in response thereto to subject the motor diaphragm alternately to main reservoir and atmospheric pressures.

CHARLES A. CAMPBELL.